United States Patent
Matsumoto

Patent Number: 6,150,933
Date of Patent: Nov. 21, 2000

[54] VEHICLE BRAKE LIGHT SYSTEM

[76] Inventor: Kiyoto Matsumoto, 2281 West Railway Street, Abbotsford, British Columbia, Canada, V2S 2E3

[21] Appl. No.: 09/287,638

[22] Filed: Apr. 7, 1999

[51] Int. Cl.⁷ .................................................. B60Q 1/44
[52] U.S. Cl. ...................... 340/479; 340/467; 340/478; 340/479
[58] Field of Search .................... 340/479, 478, 340/468, 467, 464, 461

[56] References Cited

U.S. PATENT DOCUMENTS

| | | | |
|---|---|---|---|
| 5,150,098 | 9/1992 | Rakow | 340/479 |
| 5,694,112 | 12/1997 | VannRox et al. | 340/472 |
| 5,831,523 | 11/1998 | Lange | 340/479 |
| 5,856,793 | 1/1999 | Tonkin et al. | 340/903 |

*Primary Examiner*—Jeffery A. Hofsass
*Assistant Examiner*—Son Tang

[57] ABSTRACT

A vehicle brake light system comprises a plurality of lamps arranged in endless array, a brake pedal linkage operable in response to depression of a brake pedal and a controller operable to effect brief illumination of the lamps in sequence around the array in response to operation of the brake pedal linkage. The rate at which the lamps are sequentially illuminated increases in accordance with the magnitude of the brake actuation pressure.

3 Claims, 1 Drawing Sheet

VEHICLE BRAKE LIGHT SYSTEM

BACKGROUND OF THE INVENTION

1. Field of the Invention

The present invention relates to vehicle brake light systems and, more particularly, to brake light systems in which brake lights at the rear of a vehicle are illuminated in response to depression of a brake pedal.

2. Description of the Related Art

In U.S. Pat. No. 4,556,868, there is disclosed a vehicle direction signal and slow warning system employing a moving pattern of lights. More particularly, this prior system comprises a brake warning system in which, when a brake pedal switch is closed and the vehicle is still in motion, a row of lamps at the rear of the vehicle are sequentially illuminated from the middle to the right and to the left of the row.

U.S. Pat. No. 5,594,416 discloses a brake light system in which a row of lamps are flashed in dependence on the deceleration of a vehicle. More particularly, the duration and frequency of Illumination of the lights is varied in accordance with various factors including deceleration.

BRIEF SUMMARY OF THE INVENTION

According to the present invention, there is provided a vehicle brake system, which comprises a plurality of lamps arranged in an endless array, a brake pedal linkage operable in response to depression of a brake pedal and a controller operable to effect illumination of the lamps in sequence around the array in response to operation of the brake pedal linkage.

When this system according to the present invention is in use, the driver of a vehicle depresses the brake pedal to brake the vehicle and, consequently, causes the brake pedal linkage to be operated in such a manner that, in turn, the controller responds by briefly illuminating the lamps, one at a time, in sequence around the endless array. The driver of a following vehicle, therefor, is presented with a visual warning in the form of illumination travelling around the endless array.

In a preferred embodiment of the invention, the controller comprises means for increasing the rate at which the lamps are sequentially illuminated in accordance with a brake actuation pressure exerted on the brake pedal. Consequently, when the vehicle is braked heavily, for example in an emergency system, the sequence in which the lamps are illuminated around the array is speeded up so as to thereby provide a following vehicle with a corresponding warning of the amount of the brake actuation pressure.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 1:
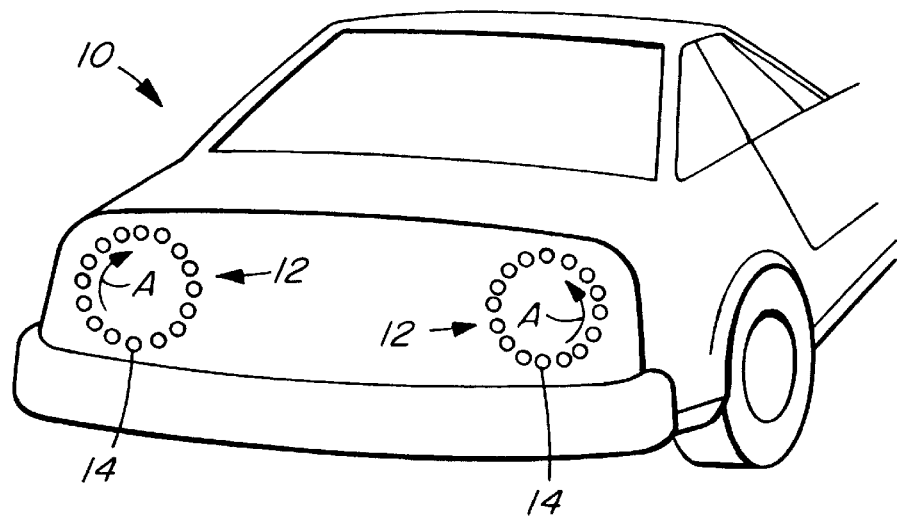
FIG. 1 shows a view in perspective of the rear of an automobile provided with a brake light system embodying the present invention.

In FIG. 1 of the accompanying drawings, reference numeral 10 indicates generally an automobile which is provided, at the rear of the automobile 10, with two horizontally spaced endless arrays, indicated generally by reference numeral 12. Each of these arrays 12 includes a plurality of lamps 14.

Figure 2:
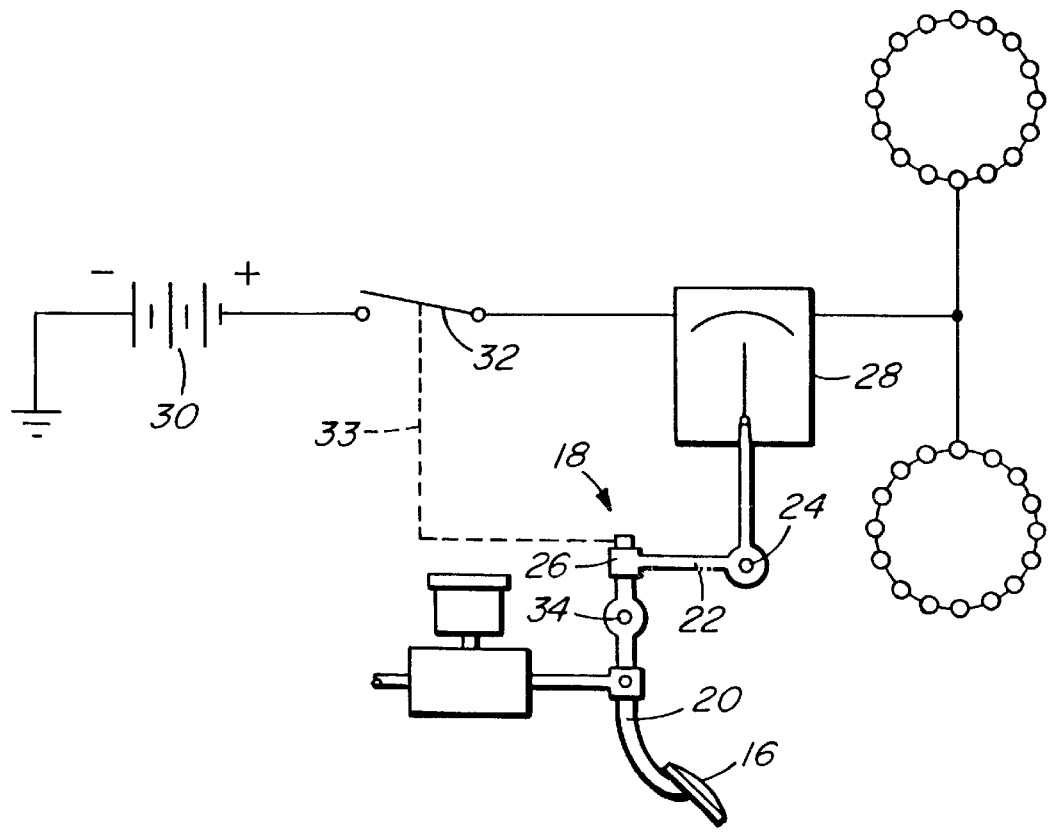
FIG. 2 shows a diagram of the brake light system in the vehicle of FIG. 1.

As shown in FIG. 2, a brake pedal 16 is connected to a brake master cylinder 18 for braking the vehicle 10 in a manner which is well known in the art and which, therefore will not be described in greater detail herein.

According to the present embodiment of the invention, the brake pedal 16 is connected to a brake pedal linkage indicated generally by reference numeral 18. The linkage 18 includes a lever 20 connected to the brake pedal 16 and an elbow lever 22 pivotable about a pivot 24 and connected slidably to the upper end of the lever arm 20 by means of a sleeve 26. The lever 22 is connected to a multifunction controller 28 for actuating the latter. The multifunction controller 28 is a commercially available product of a type commonly employed for controlling neon signs.

The vehicle 10 is provided with a battery 30 which is connected through a brake switch 32 to the multifunction controller 28. The multifunction controller, in turn, is connected to the two lamp arrays 12. The brake switch 32 is linked, by means of a connection diagrammatically represented by a broken line and indicated by reference numeral 33, to the brake pedal 16 so that, on depression of the brake pedal 16, the switch 32 is closed immediately, in a manner well known to those skilled in the art.

The lamp arrays 12 each comprise a plurality of the lamps 14 connected in sequence to form a commercially available lamp array, e.g such as that sold under the trade name "ROPELIGHTING" by BC Innovative Sign Company of Burnaby, British Columbia, Canada. In the present embodiment, the arrays 12 are circular, but the lamps 14 may alternatively be arranged in racecourse-shaped arrays or other endless arrays.

The operation of the above-described system is as follows. On depression of the brake pedal 16, the lever arm 20 is pivoted clockwise about a pivot 34, and thus causes the elbow lever 22 to pivot correspondingly about the pivot 24. The pivotation of the elbow lever 22 operates the multifunction controller 28 so as to effect brief illumination of the lamps 14 in sequence around each of the arrays 12, in the directions indicated by arrows A in FIG. 1, in response to the operation of the brake pedal linkage 18.

Further, as the pressure on the brake pedal 16 is increased, and the deflection of the brake linkage 18 is correspondingly increased., the multifunctioned controller 28 operates to correspondingly increase the speed at which the lamps are sequentially illuminated.

As will be apparent to those skilled in the art, various modifications may be made in the above described brake light system within the scope of the appended claims.

I claim:

1. A vehicle brake light system, comprising:

a plurality of lamps arranged in an endless array;

a brake pedal linkage operable in response to depression of a brake pedal; and a controller operable to effect brief illumination of said lamps in sequence around said array in response to operation of said brake pedal linkage.

2. A vehicle brake light system as claimed in claim 1, wherein said array is one of a pair similar arrays spaced apart horizontally at the rear of a vehicle, said controller being connected to both of said arrays.

3. A vehicle brake light system as claimed in claim 1, wherein said controller comprises means for increasing the rate at which said lamps are sequentially illuminated in accordance with the magnitude of a brake actuating pressure exerted on said brake pedal.

* * * * *